United States Patent [19]

Cunningham, Jr. et al.

[11] 4,374,321
[45] Feb. 15, 1983

[54] AUTOMATIC TEMPERATURE CONTROLLER FOR AN ELECTROPHOTOGRAPHIC APPARATUS FUSER AND METHOD THEREFOR

[75] Inventors: Joseph E. Cunningham, Jr.; Philip T. Gianos, both of Boulder, Colo.

[73] Assignee: International Business Machines Corporation, Armonk, N.Y.

[21] Appl. No.: 300,729

[22] Filed: Sep. 10, 1981

Related U.S. Application Data

[63] Continuation of Ser. No. 102,508, Dec. 11, 1979, abandoned.

[51] Int. Cl.³ .............................................. H05B 1/02
[52] U.S. Cl. ................................. 219/497; 219/505; 219/501; 219/216; 219/499; 323/235; 307/252 UA
[58] Field of Search .............. 219/216, 490, 491, 494, 219/497, 499, 501, 507, 506, 505, 508; 307/117, 252 UA; 323/235; 355/14

[56] References Cited

U.S. PATENT DOCUMENTS

| | | | |
|---|---|---|---|
| 3,878,358 | 4/1975 | Barton et al. | 219/505 |
| 4,046,991 | 9/1977 | Sefton et al. | 219/497 |
| 4,097,723 | 6/1978 | Leitner et al. | 219/494 |

Primary Examiner—B. A. Reynolds
Assistant Examiner—M. H. Paschall
Attorney, Agent, or Firm—Gunter A. Hauptman

[57] ABSTRACT

A copier fuser roll's temperature is accurately maintained by supplying selected half-cycles of current from a power supply to a heater in accordance with signals from a temperature sensor. Each sequential half-cycle is assigned a unique digital input number which accesses a table of digital output numbers having values chosen to correspond to one or more half-cycles. Sensor signals are sampled and digital temperature error numbers, determined by the fuser roll temperature and a desired roll temperature, are derived. The temperature error and output numbers are compared and, whenever a comparison occurs, the corresponding half-cycle of current operates the heater. Thus, depending upon the difference between a desired and the actual roll temperature, variable numbers of evenly spaced complete half-cycles, having a total positive-to-negative ratio approaching unity, are selected.

6 Claims, 6 Drawing Figures

AUTOMATIC TEMPERATURE CONTROLLER FOR AN ELECTROPHOTOGRAPHIC APPARATUS FUSER AND METHOD THEREFOR

This is a continuation of application Ser. No. 102,508, filed Dec. 11, 1979, now abandoned.

BACKGROUND OF THE INVENTION

1. Field of the Invention

The invention relates to electrophotography and, more particularly, to automatically controlling the amount of electrical energy supplied to a fuser.

2. Description of the Prior Art

In an electrophotographic apparatus, for example a xerographic copier, a pattern of toner is placed on paper in accordance with an image on an original document. The toner is fixed on the paper to form a permanent copy of the original image by applying a combination of heat and pressure to the toner and paper. For example, in a typical copier, the paper carrying loosely adhering toner is passed between a heated fuser roll and a backup roll to essentially melt the toner into the paper.

The quality of the result depends upon the temperature to which the paper is brought during the fusing operation. At the extremes, too high a temperature will undesirably remove toner from the paper, while too low a temperature will fail to properly bond the toner to the paper. In practical systems, a major problem is non-uniformity of heat application over the duration of a "copy run"; the copying of one or more originals during a single continuous operator-initiated job. Successive sheets of paper may reach different temperatures, not all within the acceptable range, and different sizes of paper may reach different temperatures at different times. Further, within a copy run, not all parts of the same sheet of paper will be within the acceptable range of temperature during the entire fusing operation, resulting in a wide spectrum of quality problems involving the paper and toner. These problems are believed to be due to many factors, such as: differing thermal load presented by different qualities, sizes and weights of paper; materials and environmental factors affecting the thermal transfer between the fuser surface and the paper; and the degree of temperature control achieved at the surface where the paper contacts the fuser. It is the latter factor that is addressed by this invention.

A physically massive fuser roll will eventually reach a stable surface temperature which is substantially independent of external factors such as the size and quantity of paper placed in contact with it or the rate at which the paper is fed past the roller. However, copier size, energy availability and time-to-first-copy restrictions dictate that a fuser roll be as physically small as possible. Commercial copiers acceptable in an office environment ideally must be physically small, cannot generate excessive quantities of heat and must be connected to a conventional wall outlet. The fuser heater is often a major source of heat and user of electrical energy, and the size of the fuser is a significant factor in the size of the copier. Therefore, a small fuser is desirable because it generates less heat, uses less power, takes up less space, etc. However, the smaller the fuser roll mass relative to the mass of the copy paper, the greater will be the thermal load effect of the paper on the roll. That is, each sheet will have a greater cooling effect on a small roll than on a large roll. The techniques used to maintain the fuser roll at a constant temperature, regardless of external thermal factors, thus become extremely important for a fuser roll which has a mass which is not very much greater than the mass of the copy paper. These are especially important where a large thermal load is present because (as in a fast copier) many sheets of paper are rapidly fed through the fuser.

The prior art discloses solutions to the problem of accurately controlling fuser temperature. The simplest prior art technique provides an on-off thermostat in series with the fuser heater. While this approach to the problem controls fuser temperature, on-off cycling does not always provide the accuracy required by compact and fast copiers, even where the thermostat is extremely accurate. The primary disadvantage of on-off cycling is that the peak power requirements are significantly greater than the average power used for heating. Thus, a copier with an on-off thermostat must be connected to an undesirably large current source. For example, a typical commercial copier requires a dedicated power circuit capable of supplying as much as 3–5 kilowatts. This large power requirement is determined in part by "worst case" fuser conditions, such as the age of the heating element, original manufacturing tolerances and line voltage variations.

Another prior art solution is to supply only portions of each available power cycle to heat the fuser. The portions are selected as a function of the fuser temperature sensed by a thermostat. One shortcoming of this approach is that since it requires electronic switching of substantial load currents, physically large electrical parts are required, energy may be wasted and undesirable electromagnetic radiation occurs.

In U.S. Pat. No. 3,961,236, accuracy is increased by monitoring fuser heater voltage and current and then adjusting input power to maintain power consumption constant. Adjustment is obtained by controlling the number of complete alternating current half-cycles supplied by a power source to the fuser. Since the load current is supplied in complete half-cycles, switching of the load current may be accomplished at zero-crossings to greatly reduce component size, electromagnetic noise and, in some cases, energy dissipation. U.S. Pat. No. 3,541,429 discloses a welding current phase angle controller which selects portions of alternating current half-cycles in accordance with preselected digital numbers. A lamp dimmer disclosed in U.S. Pat. No. 3,691,404 selects groups of alternating current cycles in accordance with digital quantities chosen by manually adjusting a switch. The cycles are switched at zero-crossings. U.S. Pat. No. 3,259,825 shows a servo drive wherein varying numbers of positive half-cycles are selected at zero-crossings as a function of a control voltage. Power to a heat source is controlled in U.S. Pat. No. 3,878,358 by removing full cycles from a succession of alternating current cycles, as a function of the output from a heat sensor. U.S. Pat. No. 3,456,095 selects the frequency at which positive half-cycles of power are supplied to a heater as a function of signals from a heat sensor.

While the foregoing prior art addresses the problem of accurately controlling the temperature, several shortcomings remain. A significant shortcoming of most prior art designs is the large peak power requirement discussed with reference to on-off thermostats, but also applicable to other prior art solutions. For example, depending upon which approach is selected, high, instantaneous or average currents are switched, special electric supply sources are required, electromagnetic noise is generated, fuser temperature is not sensed, undesirable direct current components are present (when the difference between the numbers of positive and negative half-cycles is not zero), large physical size is necessary, finely graduated adjustments are not possible, manual intervention is required, etc. Some of these shortcomings are discussed in a contemporaneous article by McCarthy and Danesh entitled "A Novel Method of Direct Digital Integral-Cycle Power Control" published May, 1978, in the IEEE TRANSACTIONS ON INDUSTRIAL ELECTRONICS AND CONTROL INSTRUMENTATION at pages 149–154. The authors disclose a method for controlling power by subdividing half-cycles into pulse trains having frequencies which are binary submultiples of the power supply frequency. The half-cycles begin and end at zero-crossings and, if controlled in pairs, minimize the load current direct current component. In an application, Ser. No. 921,659, filed July 3, 1978, "Microprocessor Controlled Power Supply for Xerographic Fusing Apparatus", by L. M. Ernst, assigned to International Business Machines Corporation, a copier fuser receives a first number of half-cycles per unit of time in one mode and a different number in another mode.

SUMMARY OF THE INVENTION

The invention accurately controls the temperature of a copier's fuser by separately selecting a number of positive and negative half-cycles of current per unit of time as a function of the temperature detected by a transducer. The selection, which occurs at current zero-crossings, results in: (1) only as many half-cycles as are necessary to achieve a predetermined fuser temperature, and (2) a substantially equal number of positive and negative half-cycles, thus minimizing the direct current component. More particularly, the invention compares digital representations of temperature signals sampled from a sensor to digital functions of the sequence numbers of a train of power supply current half-cycles. Particular individual half-cycles will be selected as a result of the comparison of temperature samples with functions of contemporaneous half-cycles. Functions are assigned to positive and negative half-cycles to maintain the fuser temperature at a predetermined level without generating a direct current component. Different copier operating conditions (such as "standby", "run", etc.) may be accommodated by selecting different functions for expressing the relationship between the sequence numbers and the temperature samples so that different levels of operation are predetermined. A zero-crossing detector is connected in a manner insuring that half-cycles of the source current are selected only at source voltage (or current) zero-crossings.

The foregoing and other objects, features and advantages of the invention will be apparent from the following more particular description of preferred embodiments of the invention, as illustrated in the accompanying drawings.

Figure 1:
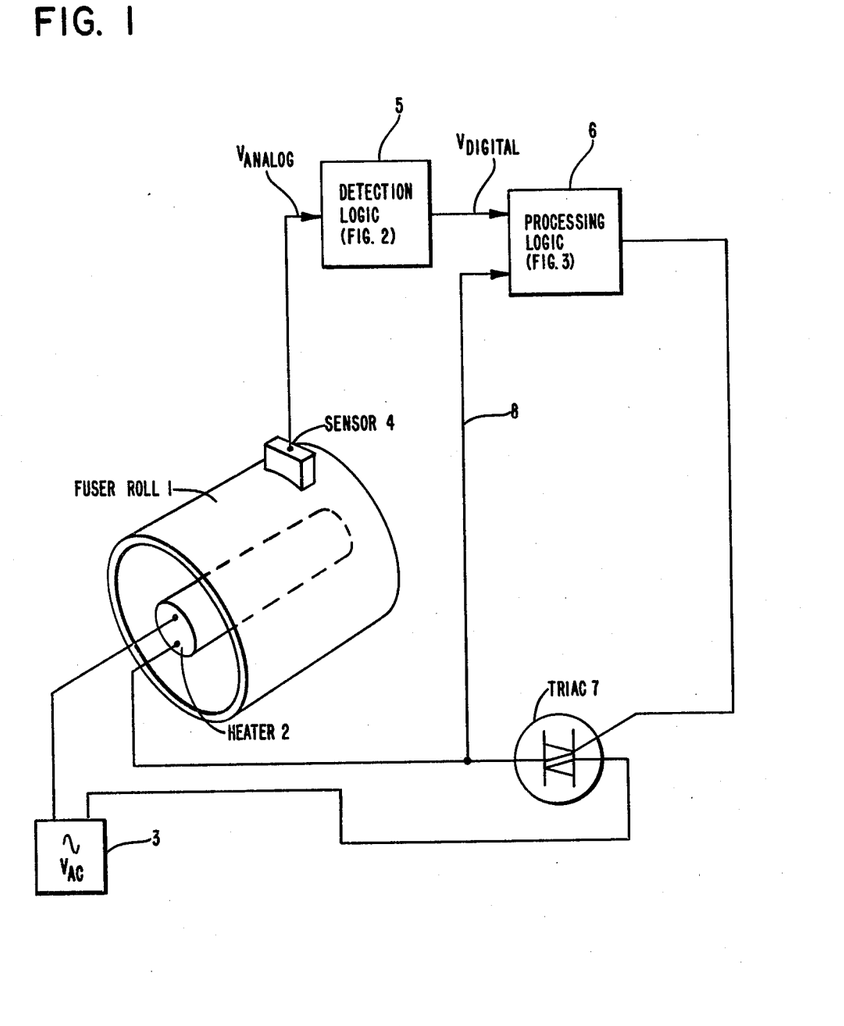
FIG. 1 is an overall view of a fuser temperature control system.

Referring to FIG. 1, there is shown an overall view of a fuser temperature control system for a copier utilizing the invention described herein. The invention may also be utilized in other devices requiring energy control, and the result of the energy controlled may be characterized in terms other than temperature. A fuser roll 1 of conventional metallic construction is heated by a heater 2. The heater 2 is conventionally a source such as a lamp or a series of high temperature wires supplied by a power supply $V_{AC}$ 3. It is also within the scope of the invention to use energy removal means such as a thermoelectric cold junction with, or without, a separate heat source. The power supply in the embodiment shown is an alternating current supply selectively connectable to the heater 2 by operation of a switching triac 7. The temperature of the fuser roll is sensed by a sensor 4 which supplies analog signals to the detection logic 5. Detection logic 5 serves to eliminate noise and convert the analog voltage to digital data representations utilizable by processing logic 6. The processing logic 6 gates the triac 7 in accordance with the (a) digital data representations from the detection logic 5, representing fuser roll 1 temperature, and (b) signals on line 8 indicating the instantaneous state of power supply variations from the power supply $V_{AC}$ 3.

The purpose of the system shown in FIG. 1 is to control conditions sensed by the sensor 4 accurately and selectively. For example, the degree of control required during normal copy runs is more stringent than that required during "standby" operations when the copier is awaiting use. The processing logic 6 operates the triac 7 to selectively supply to the heater 2 only some of the cycles from the alternating current voltage source 3. The processing logic 6 selects those cycles necessary to maintain the fuser roll 1 at a desired level, as determined by the sensor 4, within a range determined by the current mode of operation of the copier, while minimizing the difference between the number of positive and negative cycles selected during intervals to: (a) provide as small a DC component to the heater 2 as possible and (b) to keep the average current over a few cycles close to the average current over many cycles. For example, during standby operation, the processing logic may operate the triac 7 to supply between 0 percent and 100 percent of the maximum power available from the power supply 3 to the heater 2, the supply being incremented in steps ranging in increments that exceed 50 percent to much smaller increments of only a few percent. During copying operations, however, the degree of control exerted would be in steps never exceeding a few percent.

The amount of power utilized by the heater 2 has been empirically determined for a typical lamp. For a gas-filled lamp, the power radiated out of the lamp P is approximately shown by the following relationship based on Moon's equations:

$$P = (P_O)\left[\frac{(V_{AC} - V_{TRIAC})\sqrt{\frac{N}{M}}}{V_O}\right]^{1.543}$$

where:

P = Radiant power out
$P_O$ = Rated maximum power of lamp at $V_O$ $V_{AC}$ = Voltage (RMS) available from power supply 3
$V_{TRIAC}$ = Voltage across triac 7
N = Number of power supply cycles selected
M = Number of power supply half-cycles in the set from which N is selected
$V_O$ = Rated voltage of the lamp Assuming that a (theoretically 100 percent efficient) lamp having a rating of 700 watts ($P_O$) at 127 volts ($V_O$) RMS is used and that a sequence of 32 half-cycles (16 cycles) of the power supply voltage is used, the following table shows the percentage of power radiated by the lamp as a function of the number of half-cycles selected:

TABLE I

| N (No. of Half-Cycles on) | Percentage of Full Power (For $V_{TRIAC} = 0$) |
| --- | --- |
| 0 | 0.0 |
| 1 | 6.90 |
| 2 | 11.78 |
| 3 | 16.10 |
| 4 | 20.11 |
| 5 | 23.88 |
| 6 | 27.49 |
| 7 | 30.96 |
| 8 | 34.32 |
| 9 | 37.58 |
| 10 | 40.76 |
| 11 | 43.87 |
| 12 | 46.92 |
| 13 | 49.91 |
| 14 | 52.84 |
| 15 | 55.74 |
| 16 | 58.58 |
| 17 | 61.39 |
| 18 | 64.15 |
| 19 | 66.89 |
| 20 | 69.59 |
| 21 | 72.26 |
| 22 | 74.90 |
| 23 | 77.51 |
| 24 | 80.09 |
| 25 | 82.18 |
| 26 | 85.20 |
| 27 | 87.72 |
| 28 | 90.21 |
| 29 | 92.68 |
| 30 | 95.14 |
| 31 | 97.59 |
| 32 | 100.00 |

For example, in the above table, if every second half-cycle is skipped by causing the processing logic 6 to operate the triac 7 on alternate cycles from the power supply 3, 16 of the 32 available half-cycles will be supplied to the lamp 2. Reference to the Table I shows that the lamp will be operated to radiate 58.58 percent of its full power. If the processing logic 6 is adjusted in accordance with temperature sensed on the fuser roll 1 by the sensor 4, the number of half-cycles on which the lamp is operated can be changed to maintain the fuser roll 1 temperature sensed by the sensor 4 within a desired range. For example, if detection logic 5 supplies digital signals to the processing logic 6 indicating that the temperature of the fuser roll 1 has dropped, the processing logic 6 can supply to the triac 7 an increased number of signals, causing the lamp to be turned on for a larger number of half-cycles. Thus, if the lamp is being turned on for 16 out of 32 half-cycles and the temperature has decreased, the processing logic 6 can cause the triac 7 to turn the lamp 2 on, for example 24 out of 32 half-cycles, causing the lamp to supply 80.09 percent of its full power. If this increased radiation from the lamp 2 causes the fuser roll to become too hot, the sensor 4 will signal the detection logic 5 of the change and the processing logic 6 will cause the number of half-cycles to decrease. For example, if the temperature has increased, the processing logic 6 will signal the triac 7 to pass to the lamp 2, for example, 10 out of 32 half-cycles, giving the lamp sufficient power to operate at 40.76 percent of its full power. The processing logic 6 may reassign power levels after any full pattern of 32 half-cycles has been completed.

The foregoing discussion has illustrated the utilization of processing logic 6 to select the number of cycles of operation of a lamp 2 to maintain the temperature of a fuser roll 1 within a desired range. What has not been described is the technique for accurately maintaining the power within the desired range, the technique for minimizing imbalance between the number of positive and negative half-cycles (causing undesirable DC current components), the technique for avoiding noise generation by switching the triac 7 only at voltage zero-crossings, and the technique for causing selectively different operation for different modes of copier operation.

Figure 2:
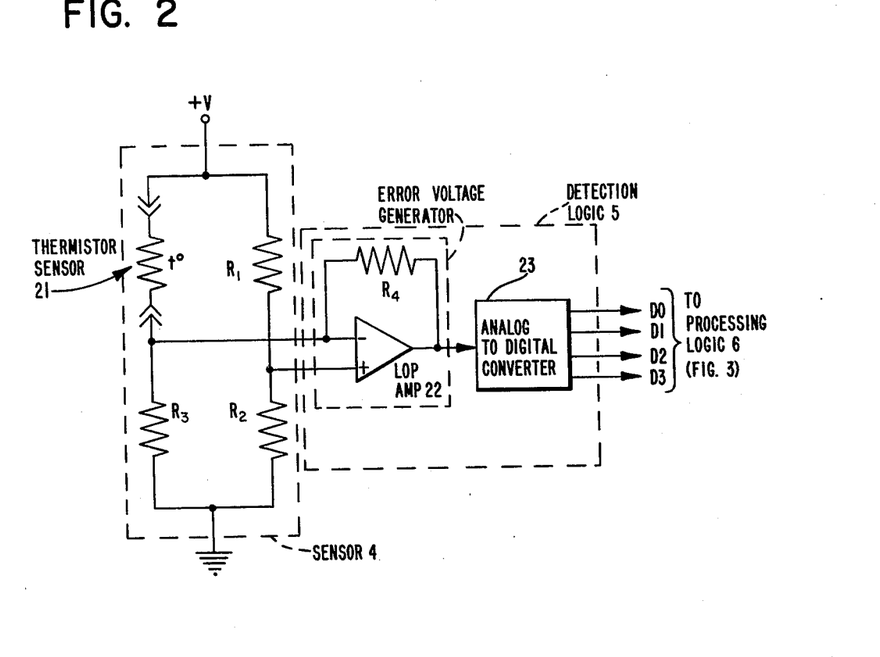
FIG. 2 is a diagram of a sensor and its connected detection logic circuit.
Figure 3:
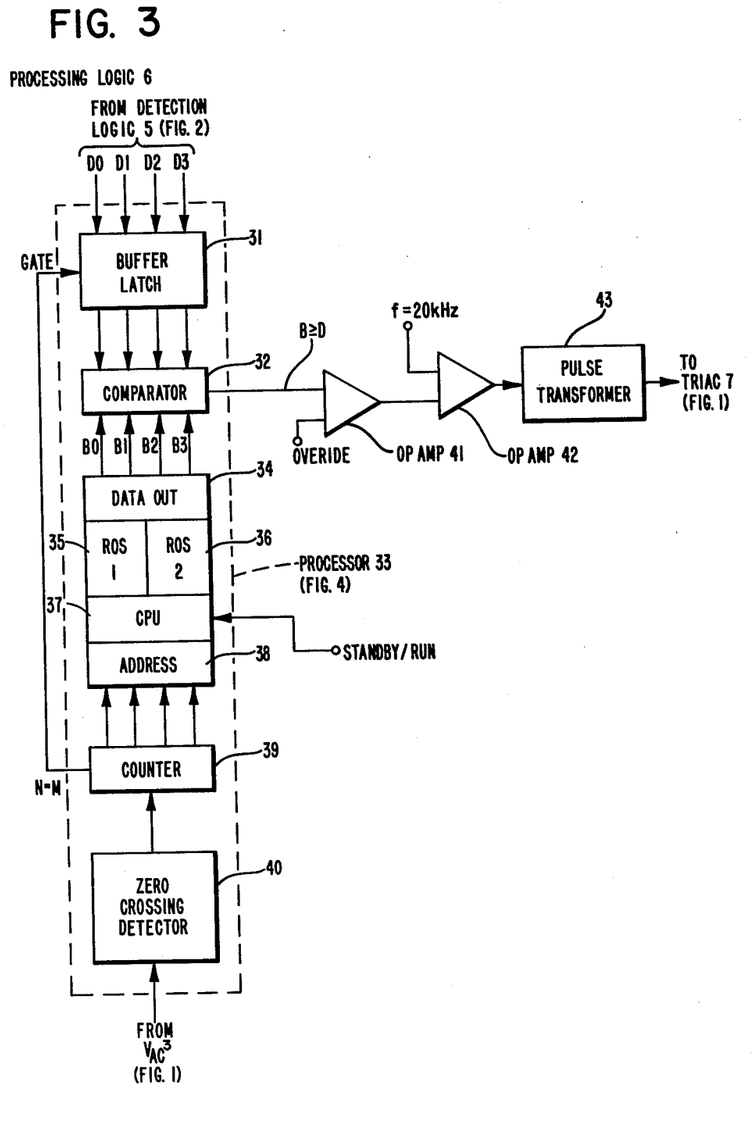
FIG. 3 is a block diagram of processing logic.

Referring now to FIGS. 2 and 3, the detection logic 5 and processing logic 6 for achieving the objects of the invention will now be described. In FIG. 2, the detection logic 5 comprises a sensor 4 configured as a bridge circuit wherein a thermistor sensor 21 is provided in one arm of a bridge also containing three resistors. The thermistor sensor 21 changes its resistance R1, R2 and R3 in accordance with the temperature to which it is subjected. The degree of imbalance of the bridge determines an error signal as described in the referenced Ernst application and Ser. No. 9,329, filed Feb. 5, 1979, "Range Tracking Analog to Digital Converter for Use with a Bridge", by J. E. Cunningham, Jr., and A. Grombone, both assigned to International Business Machines Corporation. It will be understood that the well known technique of measuring temperature by unbalancing a bridge, as shown, can be replaced by any other type of temperature sensing technique desired, such as solid state sensors. Detection logic 5 includes, in addition to an error voltage generator comprising a resistor R4 and an operational amplifier 22, an analog-to-digital converter 23 which supplies binary digital data in parallel on lines D0-D3 to processing logic 6 in FIG. 3. The example shown herein assumes that the voltage representing the temperature sensed by thermistor sensor 21 is converted into a numerical digit represented by binary encoded data on four lines D0-D3 essentially simultaneously. It is not, however, essential to the invention that this particular convention be used because any other form of digital representation will suffice.

In FIG. 3, the digital data representation on lines D0-D3 from detection logic 5 in FIG. 5 is latched in a gated buffer latch 31 and made available during the period of latching to a comparator 32. It is not essential to the invention that the data available from the buffer latch 31 to the comparator 32 digitally correspond to the actual temperature sensed on the fuser roll on any particular temperature scale. For example, for simplicity, it is useful to view the digital representations provided by the buffer latch 31 to the comparator 32 as representing, for example, the number 100 when the fuser roll 1 is at 100 degrees Celsius. This useful, illustrative view is not, however, necessarily the relationship actually utilized in that any convenient relationship of digital data representations to actual temperature may be selected as convenient. The comparator 32 also receives bits on four additional lines B0–B3 representing another digital number utilizing any convenient numerical relationship. When the comparator 32 detects a predetermined correspondence between the digits D0–D3 and B0–B3, a signal occurs on its output line B≧D connected to operational amplifier 41. For purposes of illustration, the output line is shown to carry a signal whenever the digits B0–B3 are larger than or equal to the digits D0–D3. However, it is not necessary that this correspondence be used in that the reverse is equally useful and it is also possible to sense equalities only. It is only necessary that the information supplied to the comparator be selected with the state utilized in mind. The signal at the output of the comparator 32 passes through the operational amplifier 41 and the operational amplifier 42 to a pulse transformer 43 before gating the triac 7 in FIG. 1. The operational amplifier 41 may be selected by an override signal for test purposes, and the operational amplifier 42 is modulated by a high frequency signal to permit the use of a relatively small pulse transformer 43. The triac 7 is operated for one cycle of the current from the source 3 for each pulse supplied as the result of a successful comparison signal from the comparator 32 in accordance with the normal mode of operation of triacs.

The digital data B0–B3 is representative of a number derived from the sequence number representing the half-cycle of the set of half-cycles M. For example, where M equals 32, each half-cycle in the sequence of 32 half-cycles is numbered in sequence from 1 through 32. Other numbers D0–D3 may be assigned to each one of the 32 half-cycles. These assigned numbers are compared to the digital temperature representations supplied to comparator 32 by buffer latch 31. The required digital data conversion is accomplished by supplying to a data-out register 34 a number stored in one of the read-only stores 35 or 36 at an address specified in register 38. Thus, the address in register 38 provides an argument for a table in one of the read-only storages 35 and 36, which argument specifies a value supplied to the data-out register 34 lines B0–B3. For each table, the same value will always be found for a particular argument. However, it is possible that two or more values may be the same. The necessary accessing operations required to perform the table look-up and conversion operations are performed by a central processing unit 37. The address supplied to the address register 38 is provided by a counter 39 which is stepped by a zero-crossing detector 40 connected to the power supply 3 in FIG. 1. The zero-crossing detector 40 supplies a signal whenever the power supply voltage from the power supply circuit 3 goes to 0. This not only identifies the beginning of each half-cycle, but also guarantees that all operations will occur when the power supply voltage is at or near 0; this reduces noise generation and reduces the necessary size of switching components. The pulses from the zero-crossing detector 40 step the counter 39 through sufficient positions to indicate to the address register 38 the sequential number of the half-cycle. For example, the first one of 32 half-cycles will cause the number 1 to be entered in the register 38, the second will cause the number 2 to be entered therein, etc.

Since for each zero-crossing of the power supply 3 a different address is entered into the address register 38, a different number, depending upon the state of the table in read-only storage 35 or read-only storage 36, will be placed into the data-out register 34. Every time that the the number B0–B3 in the data-out register 34 compares successfully (that is B≧D) with the number (D0–D3) specified to the comparator 32 by the buffer latch 31, the triac 7 will be gated to pass one half-cycle of current to the heater 2. The counter 39 has an output connected to the buffer latch 31 which signals the occurrence of the end of a sequence of desired signals; that is, when M half-cycles of the power supply 3 have occurred, the buffer latch 31 is gated to enter a new digital data representation D0–D3 of the temperature sensed by the sensor 4. The processing logic 6 has an input for indicating to the central processing unit 37 whether the copier is in standby or run mode. One use of this information is to control the selection of the particular one of read-only stores 35 and 36 which is used for converting the data in the address register 38 to the data in the data-out register 34. For example, read-only storage 35 may be used for standby operations and a different table in read-only storage 36 may be used when the copier is in a run mode.

For example, reference is made to Table II below where the information necessary to convert data representing half-cycle sequence numbers to data representing power supply half-cycle selection signals is shown for one possible mode of copier operation.

TABLE II

| Polarity: | + | − | + | − | + | − | + | − | + | − | + | − | + | − | + | − | + | − | + | − | + | − | + | − | + | − | + | − | + | − | + | − | | |
|---|---|---|---|---|---|---|---|---|---|---|---|---|---|---|---|---|---|---|---|---|---|---|---|---|---|---|---|---|---|---|---|---|---|---|
| Half-Cycle No.: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | | |
| Half-Cycle Value (B): | 14 | 15 | 15 | 7 | 10 | 15 | 15 | 4 | 13 | 15 | 15 | 0 | 9 | 15 | 15 | 3 | 6 | 15 | 15 | 15 | 5 | 15 | 15 | 11 | 1 | 15 | 15 | 12 | 2 | 15 | 15 | 8 | | |
| Selected/Total | Temp. Value (D) | | | | | | | | | | | | | | | | | | | | | | | | | | | | | | | | | DC | % |
| 17/32 | 15 | 1 | 1 | | | | 1 | 1 | | | 1 | 1 | | | 1 | 1 | | | 1 | 1 | 1 | | 1 | 1 | | | 1 | 1 | | | 1 | 1 | | −1 | 61.39 |
| 18/32 | 14 | 1 | 1 | | | 1 | 1 | 1 | | | 1 | 1 | | | 1 | 1 | | | 1 | 1 | 1 | | 1 | 1 | | | 1 | 1 | | | 1 | 1 | | +0 | 64.15 |
| 19/32 | 13 | 1 | 1 | | 1 | 1 | 1 | 1 | | | 1 | 1 | | | 1 | 1 | | | 1 | 1 | 1 | | 1 | 1 | | | 1 | 1 | | | 1 | 1 | | +1 | 66.89 |
| 20/32 | 12 | 1 | 1 | | 1 | 1 | 1 | 1 | | 1 | 1 | 1 | | | 1 | 1 | | | 1 | 1 | 1 | | 1 | 1 | | | 1 | 1 | | | 1 | 1 | | +0 | 69.59 |
| 21/32 | 11 | 1 | 1 | | 1 | 1 | 1 | 1 | | 1 | 1 | 1 | | 1 | 1 | 1 | | | 1 | 1 | 1 | | 1 | 1 | | | 1 | 1 | | | 1 | 1 | | −1 | 72.26 |
| 22/32 | 10 | 1 | 1 | | 1 | 1 | 1 | 1 | | 1 | 1 | 1 | | 1 | 1 | 1 | | | 1 | 1 | 1 | | 1 | 1 | | | 1 | 1 | 1 | | 1 | 1 | | +0 | 74.90 |
| 23/32 | 9 | 1 | 1 | | 1 | 1 | 1 | 1 | | 1 | 1 | 1 | | 1 | 1 | 1 | | 1 | 1 | 1 | 1 | | 1 | 1 | | | 1 | 1 | 1 | | 1 | 1 | | +1 | 77.51 |
| 24/32 | 8 | 1 | 1 | 1 | 1 | 1 | 1 | 1 | | 1 | 1 | 1 | | 1 | 1 | 1 | | 1 | 1 | 1 | 1 | | 1 | 1 | | | 1 | 1 | 1 | | 1 | 1 | | +0 | 80.09 |
| 25/32 | 7 | 1 | 1 | 1 | 1 | 1 | 1 | 1 | | 1 | 1 | 1 | | 1 | 1 | 1 | | 1 | 1 | 1 | 1 | | 1 | 1 | 1 | | 1 | 1 | 1 | | 1 | 1 | | −1 | 82.18 |
| 26/32 | 6 | 1 | 1 | 1 | 1 | 1 | 1 | 1 | | 1 | 1 | 1 | | 1 | 1 | 1 | | 1 | 1 | 1 | 1 | 1 | 1 | 1 | 1 | | 1 | 1 | 1 | | 1 | 1 | | +0 | 85.20 |
| 27/32 | 5 | 1 | 1 | 1 | 1 | 1 | 1 | 1 | | 1 | 1 | 1 | | 1 | 1 | 1 | | 1 | 1 | 1 | 1 | 1 | 1 | 1 | 1 | | 1 | 1 | 1 | 1 | 1 | 1 | | +1 | 87.72 |
| 28/32 | 4 | 1 | 1 | 1 | 1 | 1 | 1 | 1 | 1 | 1 | 1 | 1 | | 1 | 1 | 1 | | 1 | 1 | 1 | 1 | 1 | 1 | 1 | 1 | | 1 | 1 | 1 | 1 | 1 | 1 | | +0 | 90.21 |
| 29/32 | 3 | 1 | 1 | 1 | 1 | 1 | 1 | 1 | 1 | 1 | 1 | 1 | | 1 | 1 | 1 | 1 | 1 | 1 | 1 | 1 | 1 | 1 | 1 | 1 | | 1 | 1 | 1 | 1 | 1 | 1 | | +1 | 92.68 |
| 30/32 | 2 | 1 | 1 | 1 | 1 | 1 | 1 | 1 | 1 | 1 | 1 | 1 | | 1 | 1 | 1 | 1 | 1 | 1 | 1 | 1 | 1 | 1 | 1 | 1 | 1 | 1 | 1 | 1 | 1 | 1 | 1 | | −1 | 95.14 |
| 31/32 | 1 | 1 | 1 | 1 | 1 | 1 | 1 | 1 | 1 | 1 | 1 | 1 | | 1 | 1 | 1 | 1 | 1 | 1 | 1 | 1 | 1 | 1 | 1 | 1 | 1 | 1 | 1 | 1 | 1 | 1 | 1 | | +1 | 97.59 |
| 32/32 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | +0 | 100.00 |

Header row "Half Cycles" spans columns 0–31.

In Table II, the half-cycles are shown sequentially numbered across the top from 0 through 31, with their alternating polarities indicated by the signs "+" and "−". The half-cycle numbers 0–31 are the numbers supplied by the counter 39 to the address register 38. The particular mode of copier operation shown by Table II is a copy run operation where accurate temperature control is essential. One of the read-only store 36 in the processor 33 is assumed to be selected for this operation. The read-only store 36 stores a table containing as arguments the half-cycle numbers shown in Table II, and the corresponding half-cycle values (bits B0–B3 of digit B in FIG. 3) are shown below them in Table II. For clarity, the half-cycle values are shown in Table II with the positive half-cycles in one row and the negative half-cycles in a second row. For example, when the counter 39 is set to 0 and supplies a number 0 to the address register 38, the number 14 will be supplied by the read-only store 36 to the data out register 34. When the counter is stepped by the zero-crossing detector 40 the next number 1, the data out register 34 will receive the number 15. The comparator 32 will give an output signal whenever the half-cycle value B is greater than or equal to fifteen minus the digital number D (D0–D3 in FIG. 3) representing the temperature supplied by the buffer latch 31. The digital number D representing the temperature supplied to the comparator 32 is chosen to be in the range of 0–15 as shown in the column to the left of Table II. A temperature value of 0 indicates a very large difference between the temperature of the fuser roll 1 and the desired temperature, whereas a temperature value of 15 indicates that the difference is either nonexistent or very small. Whenever the temperature value D at the buffer latch 31 is less than or equals the half-cycle value B at the data out register 34, the comparator 32 sends a signal to the triac 7 causing it to conduct for one-half cycle as shown by a 1 digit in the Table II. For example, in the first column, the half-cycle value 14 is greater than or equal to the temperature value in fifteen of the possible sixteen values shown. Similarly, taking for example the 32nd half-cycle, which is number 31, the half-cycle value B assigned is number 8, which will cause the triac 7 to be gated in nine of the sixteen possible temperature cases.

Still referring to Table II, it can be seen that for a given temperature value, the number of half-cycles during which the triac 7 is operated is predetermined. That is, if the temperature value is 15, the first row of ones (triac 7 operational indicators) shows that seventeen out of thirty-two of the half-cycles will be selected. The last two columns in Table II indicate the DC component of the current supplied to the heater 2 and the percentage of total power supplied to the heater 2. For a temperature value of 15, the number of negative half-cycles exceeds the number of positive half-cycles by one and the total average power supplied is 61.39 percent of the full power of the lamp. If the temperature value is the lowest possible, the row numbered 0 indicates that all thirty-two of the available thirty-two half-cycles will be supplied to the lamp, giving 100 percent of the lamp's full power and a DC component of 0. As can be seen from Table II, the difference between the number of positive and negative half-cycles is never more than one. It is, however, within the scope of this invention to provide differences other than 1, preferably 0. For example, in a variation contemplated by the inventors, each of a plurality of sets, or subsets, of half-cycle numbers may give a difference which, when combined with the other differences, gives a total of 0. Further, the DC component can be expressed as a ratio of positive to negative half-cycles, or vice versa. The power available to the heater 2 varies between 61.39 percent and 100 percent of full power during a copy run.

Referring now to Table III, the data which may be stored in read-only storage 35 for a standby mode of operation is given.

TABLE III

| Polarity: | + | − | + | − | + | − | + | − | + | − | + | − | + | − | + | − | + | − | + | − | + | − | + | − | + | − | + | − | + | − | + | − | | |
|---|---|---|---|---|---|---|---|---|---|---|---|---|---|---|---|---|---|---|---|---|---|---|---|---|---|---|---|---|---|---|---|---|---|---|
| Half-Cycle No.: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | | |
| Half-Cycle Value (B): | 14 | 14 | 14 | 7 | 10 | 14 | 14 | 4 | 13 | 14 | 14 | 0 | 9 | 14 | 14 | 3 | 6 | 14 | 14 | 14 | 5 | 14 | 14 | 11 | 1 | 14 | 14 | 12 | 2 | 14 | 14 | 8 | | |

Half Cycles

| Selected/Total | Temp. Value (D) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | DC | % |
|---|---|---|---|---|---|---|---|---|---|---|---|---|---|---|---|---|---|---|---|---|---|---|---|---|---|---|---|---|---|---|---|---|---|---|---|
| 0/32 | 15 | | | | | | | | | | | | | | | | | | | | | | | | | | | | | | | | | +0 | 0.00 |
| 18/32 | 14 | 1 | 1 | 1 | | | 1 | 1 | | | 1 | 1 | | | 1 | 1 | | | 1 | 1 | 1 | | 1 | 1 | | | 1 | 1 | | | 1 | 1 | | +0 | 64.15 |
| 19/32 | 13 | 1 | 1 | 1 | | | 1 | 1 | | | 1 | 1 | | 1 | 1 | 1 | | | 1 | 1 | 1 | | 1 | 1 | | | 1 | 1 | | | 1 | 1 | | +1 | 66.89 |
| 20/32 | 12 | 1 | 1 | 1 | | 1 | 1 | 1 | | | 1 | 1 | | 1 | 1 | 1 | | | 1 | 1 | 1 | | 1 | 1 | | | 1 | 1 | | | 1 | 1 | | +0 | 69.59 |
| 21/32 | 11 | 1 | 1 | 1 | | 1 | 1 | 1 | | | 1 | 1 | | 1 | 1 | 1 | | | 1 | 1 | 1 | | 1 | 1 | 1 | | 1 | 1 | | | 1 | 1 | | −1 | 72.26 |
| 22/32 | 10 | 1 | 1 | 1 | | 1 | 1 | 1 | | 1 | 1 | 1 | | 1 | 1 | 1 | | | 1 | 1 | 1 | | 1 | 1 | 1 | | 1 | 1 | | | 1 | 1 | | +0 | 74.90 |
| 23/32 | 9 | 1 | 1 | 1 | 1 | 1 | 1 | 1 | | 1 | 1 | 1 | | 1 | 1 | 1 | | | 1 | 1 | 1 | | 1 | 1 | 1 | | 1 | 1 | | | 1 | 1 | | +1 | 77.51 |
| 24/32 | 8 | 1 | 1 | 1 | 1 | 1 | 1 | 1 | | 1 | 1 | 1 | | 1 | 1 | 1 | | | 1 | 1 | 1 | | 1 | 1 | 1 | | 1 | 1 | 1 | | 1 | 1 | | +0 | 80.09 |
| 25/32 | 7 | 1 | 1 | 1 | 1 | 1 | 1 | 1 | | 1 | 1 | 1 | | 1 | 1 | 1 | | 1 | 1 | 1 | 1 | | 1 | 1 | 1 | | 1 | 1 | 1 | | 1 | 1 | | −1 | 82.18 |
| 26/32 | 6 | 1 | 1 | 1 | 1 | 1 | 1 | 1 | | 1 | 1 | 1 | | 1 | 1 | 1 | | 1 | 1 | 1 | 1 | | 1 | 1 | 1 | | 1 | 1 | 1 | | 1 | 1 | 1 | +0 | 85.20 |
| 27/32 | 5 | 1 | 1 | 1 | 1 | 1 | 1 | 1 | | 1 | 1 | 1 | | 1 | 1 | 1 | | 1 | 1 | 1 | 1 | 1 | 1 | 1 | 1 | | 1 | 1 | 1 | | 1 | 1 | 1 | +1 | 87.72 |
| 28/32 | 4 | 1 | 1 | 1 | 1 | 1 | 1 | 1 | 1 | 1 | 1 | 1 | | 1 | 1 | 1 | | 1 | 1 | 1 | 1 | 1 | 1 | 1 | 1 | | 1 | 1 | 1 | | 1 | 1 | 1 | +0 | 90.21 |
| 29/32 | 3 | 1 | 1 | 1 | 1 | 1 | 1 | 1 | 1 | 1 | 1 | 1 | | 1 | 1 | 1 | 1 | 1 | 1 | 1 | 1 | 1 | 1 | 1 | 1 | | 1 | 1 | 1 | | 1 | 1 | 1 | −1 | 92.68 |
| 30/32 | 2 | 1 | 1 | 1 | 1 | 1 | 1 | 1 | 1 | 1 | 1 | 1 | | 1 | 1 | 1 | 1 | 1 | 1 | 1 | 1 | 1 | 1 | 1 | 1 | | 1 | 1 | 1 | 1 | 1 | 1 | 1 | +0 | 95.14 |
| 31/32 | 1 | 1 | 1 | 1 | 1 | 1 | 1 | 1 | 1 | 1 | 1 | 1 | | 1 | 1 | 1 | 1 | 1 | 1 | 1 | 1 | 1 | 1 | 1 | 1 | 1 | 1 | 1 | 1 | 1 | 1 | 1 | 1 | +1 | 97.59 |
| 32/32 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | +0 | 100.00 |

Table III is organized in the same manner as Table II. The difference between standby operation of a copier and a copy run operation mode of a copier is that, in the former, it is not essential that the temperature of the fuser roll 1 be maintained as accurately. Therefore, when the temperature value D is 15, it is permissible to shut off the fuser; this is shown in the first line of Table III. When the temperature value is 15, no half-cycles of the available thirty-two are selected and the power supplied to the heater is 0 percent. When the temperature of the fuser 1 drops to give a temperature value, for example a value of 14 as shown in the second row, there will be a change from providing zero half-cycles to providing eighteen half-cycles. Thus, the power supplied to the heater 2 may vary between 0 percent and 64.15 percent of the full power for small temperature changes. This should be contrasted with the copy run mode of operation shown in Table II where a similar temperature variation will give a much smaller percentage change, for example from 61.39 percent to 64.15 percent.

DESCRIPTION OF THE OPERATION OF THE PREFERRED EMBODIMENT

Figure 4A:
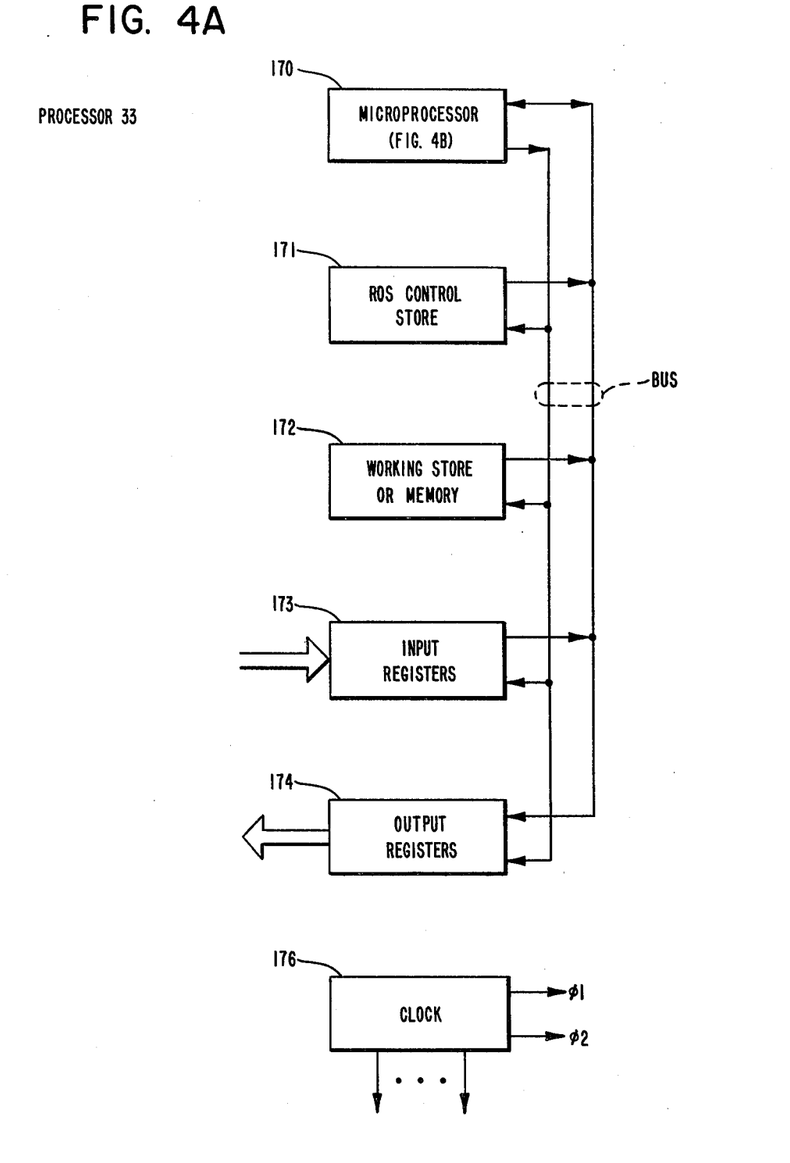
FIGS. 4A and 4B are block diagrams of a processor usable in the processing logic of FIG. 3.
Figure 4B:
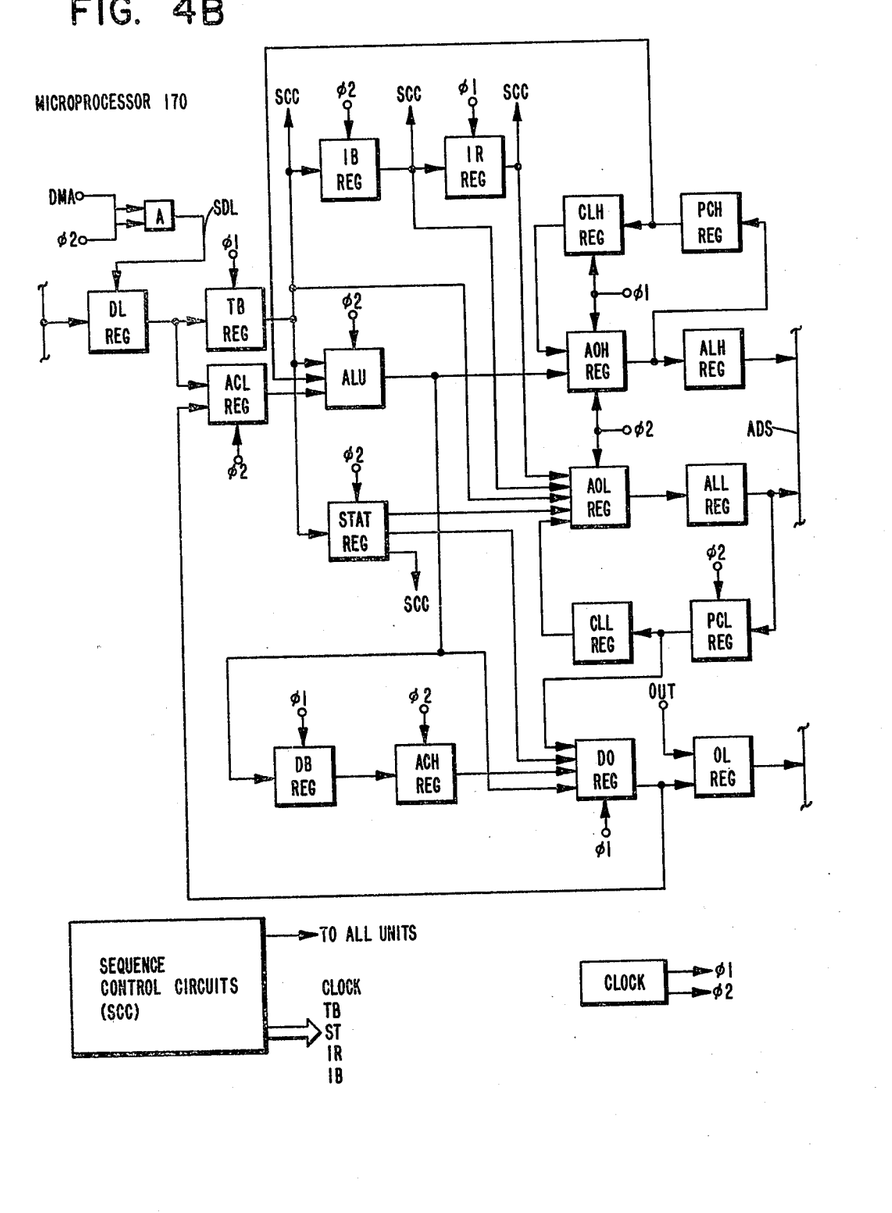
Figure 5:
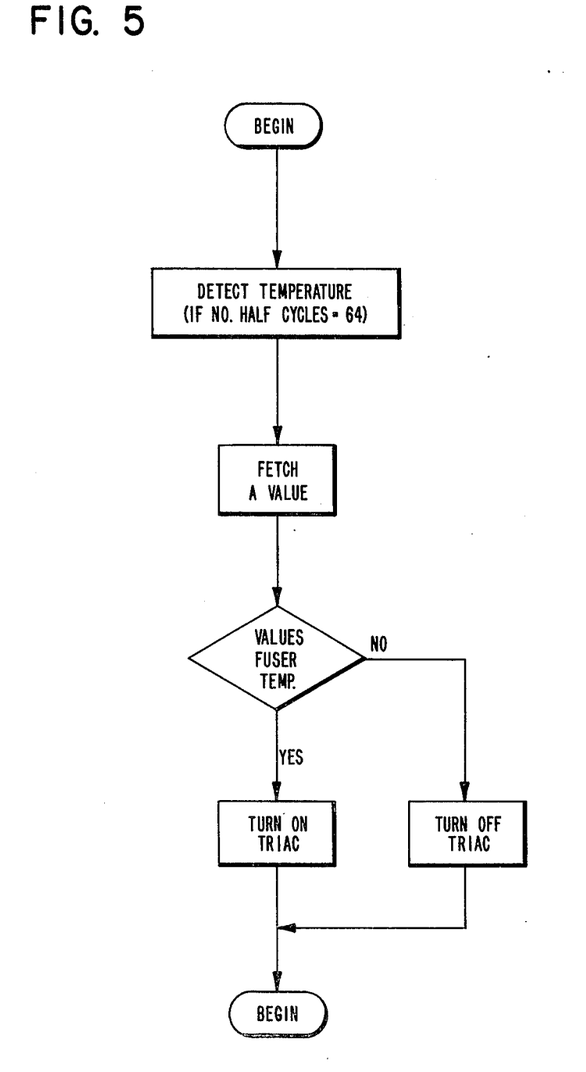
FIG. 5 is a flow diagram of the operations performed by the processing logic of FIG. 3.

Referring to FIGS. 4A, 4B and 5, the operation of the invention will be described with reference to a programmed processor. FIGS. 4A and 4B show a block diagram of a programmable machine controller described in detail in U.S. Pat. No. 4,086,658 of D. E. Finlay assigned to the International Business Machines Corporation and filed Oct. 4, 1976. The processor 33 generally shown in FIG. 4A includes a microprocessor 170 which is detailed in FIG. 4B. The microprocessor 170 is attached to a bus to which is attached read-only store 171, a working memory 172 and input and output registers 173 and 174 useful for communications with external devices such as a temperature sensor 4. A clock 176 provides timing signals. In FIG. 4B, the microprocessor 170 comprises the circuits necessary to perform instructions in accordance with a program of instructions supplied in binary machine code derived from commands in assembly language as detailed in the referenced patent. The instructions, which determine the movement of data among the registers shown, define operations in the particular processor described in the referenced patent. It is within the scope of the invention to utilize discrete logic design techniques or to substitute another processor for the one shown and to utilize an appropriate instruction language therefor. For example, the use of a higher level language such as BASIC is within the scope of this invention.

For purposes of completeness, there follows a listing of source code in assembly language for use with the processor shown in FIGS. 4A and 4B. The listing organization is outlined in the flow diagram of FIG. 5. The fuser temperature is detected by the sensor 4 by sampling and analog-to-digital conversion. The fuser temperature is sampled only after each two groups of 32 half-cycles. Then, the number of the present zero-crossing, that is the half-cycle number indicated in the counter 39, is used as an argument to fetch a value from a table (for example, based on Tables I and II) in one of the read-only stores 35 and 36. If the value B obtained from the table is greater than or equal to the present fuser temperature D, the triac 7 is turned on for one half-cycle. If the value is less than the present fuser temperature, the triac 7 is turned off for a half-cycle. The routine is then repeated to fetch another value B and, for every 64 fetches, to perform another sampling and conversion.

While the invention has been particularly shown and described with reference to preferred embodiments thereof, it will be understood by those skilled in the art that various changes in form and details may be made therein without departing from the spirit and scope of the invention.

What is claimed is:

1. In a copier system, including a heated device, a device heater and a device temperature sensor, the invention comprising:
   a digital converter, connected to the temperature sensor, operable to supply a digital value, from a set of temperature values, representing the temperature of the heated device sensed by the sensor;
   an alternating current source operable in accordance with a control signal supplied at an input, to selectively provide successively positive and negative half-cycles of alternating current;
   a counter, connected to the alternating current source, operable, as each alternating current cycle becomes zero, to count as digital values, successively provided half-cycles within a set of half-cycles;
   a memory, connected to the converter and counter, storing as electrical states, signals representing points in an array defined by the set of temperature values in one dimension and the set of counts of half-cycles in another dimension, each point having a predefined one of a plurality of values;
   accessing circuits, connected to the memory, the counter and the source, operable to sequentially access points in the array defined by a temperature digital value and, the counts of half-cycles, and supply to the source input a control signal for each accessed array point having a specified value;
   whereby the heated device receives from the source a predetermined number of the half-cycles of said set of half-cycles.

2. The system of claim 1 wherein the memory stores a plurality of arrays, and there is provided a control signal for selecting one array at a time as a function of external copier control conditions.

3. The system of claim 1 or 2 wherein the values of the array points are predefined to cause the source to supply substantially even numbers of positive and negative half-cycles to the heater.

4. In a copier system including a heated device, a heater and a device temperature sensor, the method comprising:
   supplying a digital value, from a set of temperature values, representing the temperature of the heated device;
   selectively providing successively positive and negative half-cycles of alternating current;
   counting as digital values, as each alternating current cycle becomes zero, successively provided half-cycles within a set of half-cycles;
   storing as electrical states, signals representing points in an array defined by the set of temperature values in one dimension and the set of half-cycle counts in another dimension, each point having a predefined one of a plurality of values;
   sequentially accessing points in the array defined by a temperature digital value and, the half-cycle counts; and supplying half-cycles of said set of half-cycles for each accessed array point having a specified value.

5. The method of claim 4 wherein one of a plurality of arrays is selected as a function of external copier control conditions.

6. The method of claim 4 or 5 wherein the values of the array points are predefined to supply substantially even numbers of positive and negative half-cycles.

* * * * *